US009264977B2

(12) United States Patent
Uhlik

(10) Patent No.: US 9,264,977 B2
(45) Date of Patent: *Feb. 16, 2016

(54) SYSTEM FOR ON-DEMAND ACCESS TO LOCAL AREA NETWORKS

(71) Applicant: Durham Logistics LLC, Las Vegas, NV (US)

(72) Inventor: Christopher Uhlik, Danville, CA (US)

(73) Assignee: Xylon LLC, Las Vegas, NV (US)

( * ) Notice: Subject to any disclaimer, the term of this patent is extended or adjusted under 35 U.S.C. 154(b) by 157 days.

This patent is subject to a terminal disclaimer.

(21) Appl. No.: 13/950,901

(22) Filed: Jul. 25, 2013

(65) Prior Publication Data
US 2013/0308622 A1 Nov. 21, 2013

Related U.S. Application Data

(63) Continuation of application No. 12/939,057, filed on Nov. 3, 2010, now Pat. No. 8,521,859, which is a continuation of application No. 10/334,994, filed on Dec. 30, 2002, now Pat. No. 7,849,173.

(60) Provisional application No. 60/344,899, filed on Dec. 31, 2001.

(51) Int. Cl.
*G06F 15/16* (2006.01)
*H04W 48/08* (2009.01)
*H04L 12/14* (2006.01)

(52) U.S. Cl.
CPC .............. *H04W 48/08* (2013.01); *H04L 12/14* (2013.01); *H04L 12/1403* (2013.01); *H04L 12/1446* (2013.01)

(58) Field of Classification Search
CPC ......... H04L 47/10; H04L 47/11; H04L 47/12; H04L 47/13; H04L 47/70; H04L 47/2441; H04L 47/15; H04L 47/5631
USPC .......... 370/229, 230, 235, 338; 709/200, 201, 709/202, 203, 217–227
See application file for complete search history.

(56) References Cited

U.S. PATENT DOCUMENTS

| | | |
|---|---|---|
| 5,815,665 A | 9/1998 | Teper et al. |
| 6,317,792 B1 | 11/2001 | Mundy et al. |
| 6,571,221 B1 | 5/2003 | Stewart et al. |
| 6,636,491 B1 | 10/2003 | Kari et al. |
| 6,697,864 B1 | 2/2004 | Demirtjis et al. |
| 6,779,034 B1 | 8/2004 | Mundy et al. |
| 6,834,341 B1 * | 12/2004 | Bahl et al. ..................... 713/156 |
| 6,904,026 B1 | 6/2005 | Tarnanen et al. |
| 6,948,063 B1 | 9/2005 | Ganesan et al. |
| 6,954,793 B2 | 10/2005 | Ramaswamy et al. |
| 7,032,241 B1 | 4/2006 | Venkatachary et al. |
| 7,149,896 B1 | 12/2006 | Bahl et al. |
| 7,260,638 B2 | 8/2007 | Crosbie |
| 7,269,668 B2 | 9/2007 | Redford et al. |

(Continued)

OTHER PUBLICATIONS

Stolowitz Ford Cowger LLP, "Listing of Related Cases", Jul. 25, 2013, 1 page.

*Primary Examiner* — Dady Chery
(74) *Attorney, Agent, or Firm* — Schwabe, Williamson & Wyatt

(57) ABSTRACT

A roaming company makes payments to an aggregator of independent WLAN operators in exchange for providing Internet access services to subscribers of the roaming company. Independent WLAN operator accounts are maintained at the aggregation company.

19 Claims, 2 Drawing Sheets

(56) References Cited

U.S. PATENT DOCUMENTS

| | | |
|---|---|---|
| 7,313,237 B2 | 12/2007 | Bahl et al. |
| 7,330,908 B2 | 2/2008 | Jungck |
| 7,406,707 B2 | 7/2008 | Venkatachary et al. |
| 7,444,510 B2 | 10/2008 | Venkatachary et al. |
| 7,444,669 B1 | 10/2008 | Bahl et al. |
| 7,483,984 B1 | 1/2009 | Jonker et al. |
| 7,500,263 B2 | 3/2009 | Venkatachary et al. |
| 7,548,976 B2 | 6/2009 | Bahl et al. |
| 7,849,173 B1 | 12/2010 | Uhlik |
| 7,849,177 B2 | 12/2010 | Uhlik |
| 8,255,569 B1 | 8/2012 | Bahl et al. |
| 2001/0034677 A1 | 10/2001 | Farhat et al. |
| 2001/0034693 A1 | 10/2001 | Farhat et al. |
| 2002/0010915 A1 | 1/2002 | Maeda |
| 2002/0022483 A1 | 2/2002 | Thompson et al. |
| 2002/0023003 A1 | 2/2002 | Raheman |
| 2002/0041663 A1 | 4/2002 | Malik |
| 2002/0052754 A1 | 5/2002 | Joyce et al. |
| 2002/0073182 A1 | 6/2002 | Zakurdaev et al. |
| 2002/0111848 A1 | 8/2002 | White |
| 2002/0154643 A1 | 10/2002 | Satomi et al. |
| 2002/0176579 A1 | 11/2002 | Deshpande et al. |
| 2003/0003933 A1 | 1/2003 | Deshpande et al. |
| 2004/0214572 A1 | 10/2004 | Thompson et al. |
| 2004/0243708 A1 | 12/2004 | Stebbings |
| 2005/0222953 A1 | 10/2005 | Ganesan et al. |
| 2006/0053378 A1 | 3/2006 | Fano et al. |

* cited by examiner

SYSTEM FOR ON-DEMAND ACCESS TO LOCAL AREA NETWORKS

CROSS REFERENCE TO RELATED APPLICATIONS

This application is a continuation of U.S. patent application Ser. No. 12/939,057, filed on Nov. 3, 2010, now U.S. Pat. No. 8,521,859, issued on Aug. 27, 2013, which is a continuation of U.S. patent application Ser. No. 10/334,994, filed on Dec. 30, 2002, now U.S. Pat. No. 7,849,173, issued on Dec. 7, 2010, which claims priority from U.S. Provisional Application No. 60/344,899, filed Dec. 31, 2001, the disclosures of which are incorporated by reference. This application is further related to U.S. patent application Ser. No. 11/469,320, filed on Aug. 31, 2006, now U.S. Pat. No. 7,849,177, issued on Dec. 7, 2010.

FIELD OF THE INVENTION

This invention generally relates to communication systems and, more particularly, to a business model for expanding a network architecture.

BACKGROUND OF THE INVENTION

Internet services are available today, utilizing, for example, standard wireless protocols such as Cellular Digital Packet Data, also known as "wireless Internet Protocol" (wireless IP). (See CDPD System Specification and Implementation Guidelines, Release 1.1, Wireless Data Forum, Washington, D.C.) CDPD can be implemented in American Mobile Phone Systems (AMPS) cellular networks, and thus a wireless Internet service based thereon could become widely available, but the service is slow (given a data transmission rate of 19.2 kbps) and expensive (approximately $1.40 per megabyte of data transmitted). (The AMPS is a frequency division multiple access (FDMA) analog cellular system developed by AT&T Bell Labs in the 1970s).

Additionally, wireless local area networks (WLANs), for example, those based on the IEEE 802.11 standard, are emerging. (For further information regarding the IEEE 802.11 standard, refer to IEEE 802.11, 1999 Edition (ISO/IEC 8802-11: 1999) IEEE Standard, for Information Technology—Telecommunications and Information Exchange between Systems—Local and Metropolitan Area Network—Specific Requirements—Part 11: Wireless LAN Medium Access Control (MAC) and Physical Layer (PHY) Specifications; IEEE 802.11a-1999: 8802-11:1999/Amd 1:2000(E)), IEEE Standard for Information technology—Telecommunications and information exchange between systems—Local and metropolitan area networks—Specific requirements—Part 11. Wireless LAN Medium Access Control (MAC) and Physical Layer (PHY)>specifications—Amendment 1: High-speed Physical Layer in the 5 GHz band; and IEEE 802.11b-1999: Supplement to 802.11-1999, Wireless LAN MAC and PHY specifications. Higher speed Physical Layer (PHY) extension in the 2.4 GHz band.)

WLANs currently offer peak instantaneous data rates of 11 Mbps (802.11b) or 54 Mbps (802.11b) over a range of approximately 100 meters. Despite the relatively high data rates achieved by IEEE 802.11 based WLANs, such WLANs have no standardized billing or service fee system. This lack of monetary incentive has limited the installation of 802.11 networks for public use. Thus coverage is primarily limited to private networks.

In summary, the wireless Internet service available today is an expensive, fragmented service with limited coverage. To obtain reasonable data transmission rates and service coverage, one could maintain a CDPD subscriber account, and carry a CDPD PCMCIA modem card, and an 802.11b WLAN PCMCIA card. A portable computer would utilize the 802.11b WLAN PCMCIA card for free in the home and office. It would utilize the 802.11b WLAN PCMCIA card for a fee at each hot-spot travel location such as airports and some hotels. The portable computer would use the CDPD PCMCIA modem card for general use outside the home or office. Access to the CDPD network incurs additional fees to yet another operator.

Network operators have not embraced development of a wireless infrastructure because of the perceived need to acquire sufficient licensed radio frequency spectrum to build out a nation-wide network, a costly undertaking. With the uncertainties raised by the introduction of other technologies such as GPRS/EDGE and CDMA-2000, and the recent history of the wireless market, these operators are proceeding slowly and cautiously.

What is needed is a business model, network architecture and protocols that facilitate development and operation of a wireless infrastructure to provide ubiquitous wireless Internet access.

BRIEF DESCRIPTION OF THE DRAWINGS

The present invention is illustrated by way of example, and not necessarily by way of limitation in the figures of the accompanying drawings in which like reference numerals refer to similar elements.

DETAILED DESCRIPTION

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

A business model, network architecture and software are described for implementing and operating a worldwide wireless internetwork infrastructure. The infrastructure includes a distributed wireless packet data network based on wireless local area networking (WLAN) technology and utilizing high speed (e.g., 1-54 megabits per second data rates), low cost (e.g., less than $100) wireless data terminal equipment, also known as a "user terminal" or "UT". However, it is appreciated that wireless technology and data terminal equipment are not sufficient incentives, on their own, to build a wireless network—also needed are the economic incentives to invest in building a comprehensive network necessary to support a wide variety of wireless network services.

Content Service Provider Model

An embodiment of the invention described herein aligns the interests of wireless base station operators, Internet service providers (ISPs), and content providers, and provides a means by which money flows from end users to content providers and then back to the ISPs and wireless base-station operators, thus providing an incentive to expand the wireless network infrastructure. In this manner, it is expected that, for example, thousands of entities become independent wireless base station operators. It is contemplated that some entities, such as individuals, will become base station operators for a cut of the subscriber revenue stream. Other entities, such as hotels and restaurants, will do so because their regular customers see wireless Internet coverage as a value added service. Still others will set up and operate base stations in their homes and offices simply for personal use. As a side effect of all of these interests, a wireless network infrastructure will expand to cover areas in which end users want to, and can, use their UTs.

The invention provides an environment for content providers to develop wireless services for end users while returning a fraction of the content providers revenues, for example, to the network, for distribution back to the Internet Service Providers (ISPs), and/or the radio base-station operators. It is contemplated that every entity is capable of being independent of the others, from the wireless radio base-station operators, the ISPs, to the content providers.

Figure 1:
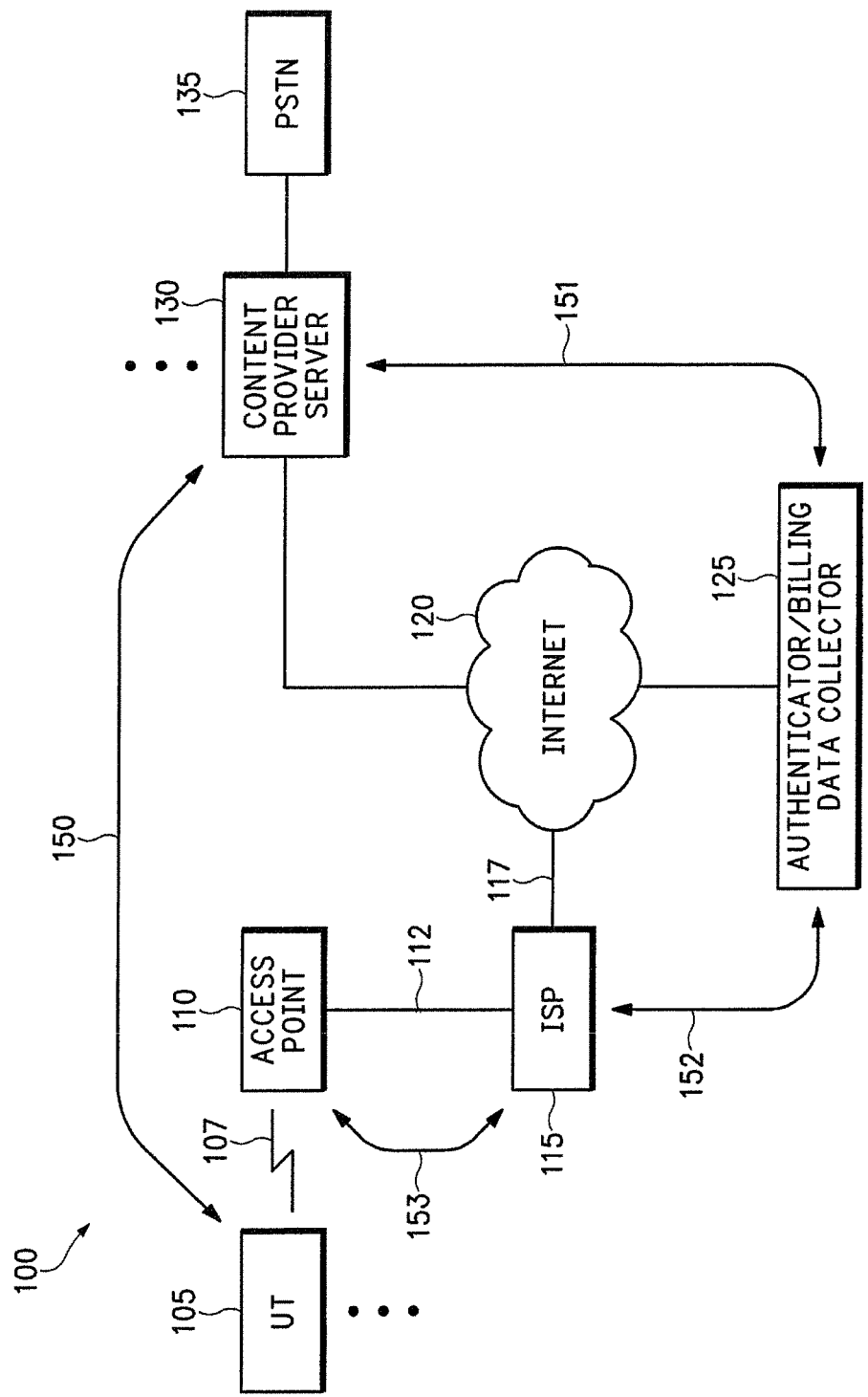
FIG. 1 illustrates an embodiment of the invention.

FIG. 1 illustrates one embodiment of the invention 100, in which independent radio base-station operators build ubiquitous wireless Internet coverage based on monetary incentives. Prior art approaches to providing such coverage suffer from scaling problems that limit the rate of growth and adoption— it is a huge task for a single or small number of entities to build and operate a complete network, market user terminals, bill subscribers, acquire radio frequency spectrum, etc. The invention differs from such other models, e.g., Metricom's now defunct Ricochet wireless Internet approach, mainly by distributing responsibility for base-station acquisition, siting, and operation to independent base-station operators in exchange for some portion of end user or subscriber revenues.

A user terminal (UT) 105 communicates with a server, for example, a server 130 connected to the Internet 120 and operated by a content service provider, such as Amazon.com. The term user terminal, as used herein, refers to a user device or user equipment, and may be any type of computing device. Additionally, a user is a device or application attached to or coupled with the UT, and an end user or subscriber is a person or entity owning or using the user/UT. The subscriber periodically pays for Internet based services, such as Voice over Internet Protocol (Voice over IP, or VoIP) phone calls, book purchases, stock quotes, etc., as represented by arc 150 in FIG. 1. A portion of these payments are distributed by the network infrastructure to the providers of the various network data carrying services actually used (denoted by arcs 151 and 152), including the operator of a wireless base station (denoted by arc 153).

The UT may be any electronic device having wireless radio frequency communication capabilities, or coupled to or with a device having radio frequency communication capabilities, such as a wireless modem. Additionally, software, such as driver software, may be resident in the UT so the UT can operate in a network in accordance with the present invention.

For example, the UT may be a desktop or laptop computer, a personal digital assistant (PDA), cellular telephone, two-way pager, or the like. In one embodiment, UT 105 contains a radio that transmits and receives Internet Protocol (IP) datagrams or packets to and from the Internet 120. The radio can be a PCMCIA card-based wireless modem. Part of the communications link between the UT 105 and the server 130 is a wireless radio frequency link 107.

A wireless access point 110, or simply, access point 110, is a wireless base-station that collects packets from and distributes packets to user terminals in its wireless coverage area. The access point typically is coupled via a link 112 to ISP 115, which in turn, connects to the Internet 120 via link 117. Ideally link 112 is fast and inexpensive (e.g. cable modem, xDSL line, wireless point-to-multipoint, etc.) but it could also be a simple dial-up connection, depending on the base station hardware and software, base station location, and amount of traffic transmitted via the base station. A person or business may be the owner and/or operator of one or more such access points.

The access point 110 can be an IEEE 802.11 base station, capable of communicating with user terminals via the radio frequency link 107 using a wireless protocol such as IEEE 802.11. While FIG. 1 illustrates a single UT and a single access point or wireless radio base station, it is appreciated that many base stations and many more UTs are utilized, indeed, desired, to support, for example, a world-wide wireless network infrastructure.

In one embodiment, the access point, in addition to providing wireless service coverage for UTs in its service area, collects billing information, for example, based on data traffic processed by the access point. The access point collects traffic data, that is, statistical data about the data traffic, necessary for billing. The access point operator receives payments, as represented by arc 153, for providing wireless Internet services. The payments can be calculated, at least in part, based on the billing information collected by the access point. The access point furthermore may collect billing information on a per UT basis, so that depending on the type of subscriber account associated with the user of the user terminal, the subscriber can be billed, and the access point can receive a portion of a payment by the user for the bill, based on the collected billing information. For example, for flat rate service (e.g., a subscriber pays $20/month), the access point need only count bytes, or number of packets, of traffic carried, while for measured rate service (e.g., a subscriber pays $15/month plus $0.10 per megabyte (MB) over 50 MB per month and $0.05 per MB over 200 MB per month), a byte count per UT (as identified, for example, by the UT's MAC address or encrypted digital identification) is maintained.

The access point includes software that routes IP packets, collects billing information, and cooperates with the other network entities to deliver network services. Alternatively, such software may reside in the ISP 115. Given the ISP's possible hardware platforms likely are more varied than the access point's possible hardware platforms, it may be, from a developer's perspective, better to develop router software for access points rather than ISP hardware platforms. Ultimately, it is contemplated that this software will be capable of being executed on many access point platforms. However, initially it is contemplated to run on a Microsoft Windows98/Windows2000/WindowsNT or Linux PC with a wireless LAN base station coupled thereto.

The router software performs many functions, including requesting authentication of UT identification as new user terminals request admission to the network; keeping track of local, private user terminals which may be allowed to use the network free of charge; filtering unauthorized traffic; providing fire-wall services so that public user terminals cannot send and receive packets to machines on a private LAN; coordinating hand-over of a roaming user terminal with other access points; tunneling (encapsulating) traffic to other access points after a roaming user terminal subscribing to full or partial mobility service has moved on to another access point; unwrapping (decapsulating) traffic tunneled to the user terminal's present access point from the user terminal's original access point; and collecting billing traffic summary statistics (for example, bytes transferred for each user terminal) and storing them for upload to the billing entity.

In one embodiment of the invention, a conventional wired Internet Service Provider (ISP) 115 provides access point concentration. That is, multiple access points access the Internet via the same ISP. In particular, each access point 110 is connected to the Internet 120, usually by the back-haul services provided by the ISP. The ISP usually has a high-speed trunk connection 117 to the Internet 120. The high-speed trunk is often a T1, T3, or ATM connection.

Responsibility for customer billing and marketing may or may not be distributed among Internet-based content and service providers, many of whom provide specialized services with specialized terminal equipment (e.g., a VoIP phone). To the extent billing is distributed between various service providers, the revenue/value chain is more complicated, but in any case, investment is further distributed and the potential for wireless network infrastructure growth is expanded in accordance with the present invention.

An authenticator 125 is connected to the Internet 120 and provides authentication services to access points and user terminals. The authenticator 125 charges a fee to content service providers, such as the content service provider operating server 130, for allowing subscribers access to the network 100. The fee provided the authenticator, represented by arc 151, is some portion of subscriber payments to content service provider 130 for providing, among other things, authentication services for the content service provider and the provider's subscribers. Router software, whether executing on the hardware platform of the access point or ISP, queries the authenticator as to whether to provide packet delivery services for a given user. The authenticator, using encryption software, communicates with a user terminal, in particular, software such as driver software, on the user terminal, to authenticate the user. In one embodiment, the authenticator also queries the content service provider to verify the subscriber has adequate credit standing to gain access to the network.

Upon receiving a response from the authenticator, router software decides whether to continue to provide packet routing and delivery services for a particular user terminal. If authentication fails, then service for the user terminal is restricted. In one embodiment, the authenticator also provides a code to the router software for use in generating encrypted billing information for that user terminal. The authenticator collects traffic data statements from router software, via the ISP back haul line 117, and stores the statements for use in calculating usage-based payments back to ISPs and access point operators, respectively represented in FIG. 1 by arcs 152 and 153. In one embodiment, if the authenticator and billing entity functionality is distributed among different platforms and/or service providers, the authenticator further uploads the collected billing traffic statistics to the billing entity hardware/service provider. In one embodiment, communication between the access point and the authenticator is encrypted to prohibit impersonation of the authenticator and/or access point.

The content service provider operating, for example, server 130, provides Internet content for which a subscriber is willing to pay money, for example, a subscription fee. In the case of a subscription fee based service, the content service provider collects periodic payments from subscribers and pays the network access bills generated by the authenticator. The authenticator then distributes some portion of these revenues, referred to herein as a rebate, back to ISPs and/or access point operators based on the services they provided (e.g., number of bytes transmitted). In some content service provider models, no value-added content is served—the subscriber simply gets an Internet connection in a fee-for-bytes or flat rate arrangement similar to a conventional, wired ISP.

The rebates can be tiered based on how much an operator pays for a base-station. Subsidized base-stations might carry a smaller rebate than ones sold without subsidy. In fact, overpayment for base-stations is possible to provide a means for an operator to invest in the billing entity service provider.

Although not shown in FIG. 1, a Home Location Register (HLR) may optionally be utilized in the network 100. The HLR comprises an Internet resident database of user terminal locations. Router software or driver software updates records in the HLR as mobile user terminals move about from WLAN to WLAN, that is, from one access point to another access point, or from one ISP to another ISP. In one embodiment of the invention, the content service provider may provide the HLR.

In conjunction with the optional HLR, an optional mobility service is available to a user terminal. The service provides a fixed IP address for a mobile user terminal. A mobility service provider can keep track of the whereabouts of a user terminal, with reference to the HLR. The actual implementation of mobility services depends on the underlying service. Mobility services provided by a single server can simply follow the user terminal around as the IP address assigned to the user terminal changes.

An important underlying principle of the wireless network architecture and business model contemplated by the present invention is that all entities participating in the set up and operation of the network should have something to gain from expanding and improving the network and its services. For example, content service providers such as Amazon, Yahoo, Quest, Level3, etc., get customers that the content providers can target with merchandise, wireless devices, and services of all kinds. A music company can sell songs for a wireless MP3 portable music database/player. An Internet VoIP phone company can sell voice communications services. An online bookstore can sell books that a subscriber downloads and reads on a portable electronic device. Online magazines can sell access to their services. A medical monitoring company can sell real-time analysis of heart rhythms, possibly detecting a heart attack before it happens. The potential applications are numerous.

Ubiquitous, high-speed, wireless Internet service opens new opportunities for providing content and services. The application content service providers increase revenue from a growing user base. Users subscribe because of all the available content. Furthermore, the application content service providers market wireless devices and services that build the user base fueling demand for the network.

Subscribers get access to a wide range of goods and services made possible by high speed, ubiquitous wireless Internet service coverage. A subscriber gets "tetherless Internet access" near any access point. The number of installed access points increases until wireless Internet service coverage becomes ubiquitous. As WLAN technologies improve, data rates increase. However, the subscriber need not wait for a full network deployment to perceive significant value. The subscriber can purchase a personal access point and have tetherless Internet access in their home or office, which is the key to getting the wireless network infrastructure in place.

As mentioned above, Internet Service Providers (ISPs) provide back-haul services from wireless access points to the Internet. A rebate scheme is structured such that the ISPs are paid for the data traffic that they transport between the Internet and access points, however calculated. Thus, it is in the interest of ISPs to encourage the installation of more and more access points providing coverage and increasing wireless Internet usage.

In one embodiment, ISPs also provide fixed IP addresses and mobility management services for users who wish to maintain a continuous Internet connection while roaming between WLANs. For services that require these continuous connections, (e.g., VoIP services) content service providers may contract with ISPs to provide fixed virtual connections to mobile users. This fixed IP address and mobility management service performs the same function as an HLR in a cellular telephone network, which are well known in the art, and thus not discussed further herein.

It is contemplated that some access point operators will install base stations just to get wireless Internet service coverage where needed for their own use as subscribers. A typical example of this scenario would be a home user who buys an access point to get coverage in their home. Back-haul services would be provided through a cable modem, xDSL line, or even 56 k dial-up connection. Depending on the range of the WLAN technology embodied in the base station, the home user might incidentally be providing service to their neighbors, for example, in apartment buildings. Another example is businesses that install base stations to provide tetherless Internet access within their facility. Security features in the access point router software would provide different routing services for company employees versus "foreign" users. For example, employees may be allowed to mount directories on a local file server, but foreign users would not see any local servers.

However important these incidental access point operators are to providing ubiquitous wireless Internet service coverage, the rebate scheme is structured to ensure an incentive to become an access point operator. Airports, hotels, coffee shops, libraries, bookstores, shopping malls, etc., will install access points for the revenue generated by rebate payments. This financial feedback is what drives operators to provide service at locations desired by users and to split wireless service areas to provide adequate capacity.

Eventually, it is envisioned that the subscriber base might be large enough that establishments such as coffee shops, bookstores, and hotels provide coverage on their premises as a service to their customers simply to maintain competitiveness in drawing customers.

The clearest incentive is to the authenticator/billing entity, which is the primary collector of the subscriber generated revenue stream, with a portion of this revenue provided to access point operators and ISPs as a rebate. The authenticator, or authentication service provider, maintains the keys to access network 100. No user terminal can access a foreign WLAN without permission from the authenticator. The authenticator also collects billing information (for example, VoIP telephone call detail records) from the ISPs for each user terminal session. This billing data is provided to content service providers for use in billing the user. The content service provider pays the authenticator to keep subscribers in the authenticator's database, thereby ensuring continued access to the network 100.

Manufacturers are presented with the opportunity to sell base stations and user terminals. Access points are not sold to a small group of large operators—instead, access points are high volume consumer electronics devices. Likewise, user terminals need not be tied to specific service providers. They can be sold directly to consumers and retailers.

Any number of content service providers can utilize network 100 and the business model described above to provide applications to subscribers. A brief description of some possible content services follows.

The simplest service is a general Internet Protocol (IP) packet delivery service. The UT in this case may be a WLAN card in a laptop PC. The services provided to the subscriber include various Internet application protocols, including HTTP (world wide web browsing), telnet, FTP, etc. The content service provider has no infrastructure other than billing, takes call detail information from the Authenticator, debits the subscriber's billing account, and sends an account statement, for example, via electronic mail, to the subscriber. The bulk of the subscription fee is transferred (as designated by arc 151 in FIG. 1) to the authenticator and then distributed to the ISPs (arc 152) and access point operators (arc 153). A typical subscription fee schedule might be:

0 to 20 MB/month @, $19.99/month, plus $1/MB for >20 MB/month

Of this, for example, 80 percent is transferred to the authenticator, and then 80 percent of that is transferred to the ISPs.

Low mobility cellular telephone service, similar to Personal Handyphone System (PHS) in Japan, can be readily provided by VoIP-enabled WLAN user terminals that have the appearance of cell phones. These user terminals cooperate with application software resident either at their home ISP or at the content service provider's servers. This software coordinates the delivery of compressed voice packets between the user's terminal and a public switched telephone network (PSTN) gateway 135 nearest the termination point of the phone call. The authenticator charges the content service provider per MB of voice traffic sent from and received by the user's user terminal (i.e., phone). The content service provider bills the user, for example, based on this usage data or, for example, based on more detailed information about call sources and destinations.

An additional application contemplated by the invention is an electronic book service that comes with an electronic book reader device with storage for several books and a display. Using the book reader device, a subscriber can visit an electronic book reader service web site, browse book content, select for purchase and purchase book content, and download book content for reading when out of wireless range (e.g. on an airplane, in a car) or even have a printed copy delivered to your house. The book reader service provider and the original author are secure in the knowledge that the downloaded book cannot be copied and further distributed without physically breaching the electronic book device.

An MP3 service would operate in a manner very similar to the electronic book service, but the information content is music rather than prose. The user terminal would have real-time access to the libraries of music content. Control of the physical user terminal device and protocols allows the content service provider to be secure in the knowledge that the music downloaded will not be illegally redistributed.

One example of an implementation of an embodiment of the invention follows. A subscriber accesses an online bank via a user terminal, UT1. The subscriber then purchases credit for 1000 units of Internet access for some amount of money, say $10. The units may represent any measure of Internet access, for example, bandwidth, time, characteristics of service, or some combination thereof. The online bank mints a certificate, N1, for the subscriber by generating a 512 bit random number, storing it in the subscriber's database record at the online bank along with an identifier for UT1, UT1_ID, and the number of units purchased, in this example, 1000 units. (The random number that is the certificate is a representation of the units purchased by the subscriber.) The random number is then encrypted and sent to the subscriber.

At some point the subscriber then accesses the Internet. An access point, AP1, receives a page from the UT1, and as part of the process of setting up a session, queries the subscriber for a deposit against future data traffic with UT1. The subscriber responds by sending the certificate to the online bank with a request that some number of units, say 2 units, be reallocated to AP1.

The online bank receives the certificate N1 from the request and verifies that UT1 indeed owns 1000 units, mints a new certificate, N2, representing 998 units for UT1, and another certificate, N3, representing 2 units for AP1, and provides the certificates to UT1 and AP1, according to the same process as described above. After both UT1 and AP1 acknowledge receiving their change (998 units) and payment (2 units), respectively, certificate N1 is removed from the subscriber's database, and certificate N2 is added in its place. The certificate N3 is added to the access point's database record maintained at the online bank as well. Alternatively, the certificate N3 is not needed; 2 credits are simply added to API's account balance at the online bank. At the end of a billing cycle, e.g., the end of the month, access points receive a check for their credit balance.

Aggregation of Wireless Internet Services Operator

Figure 2:
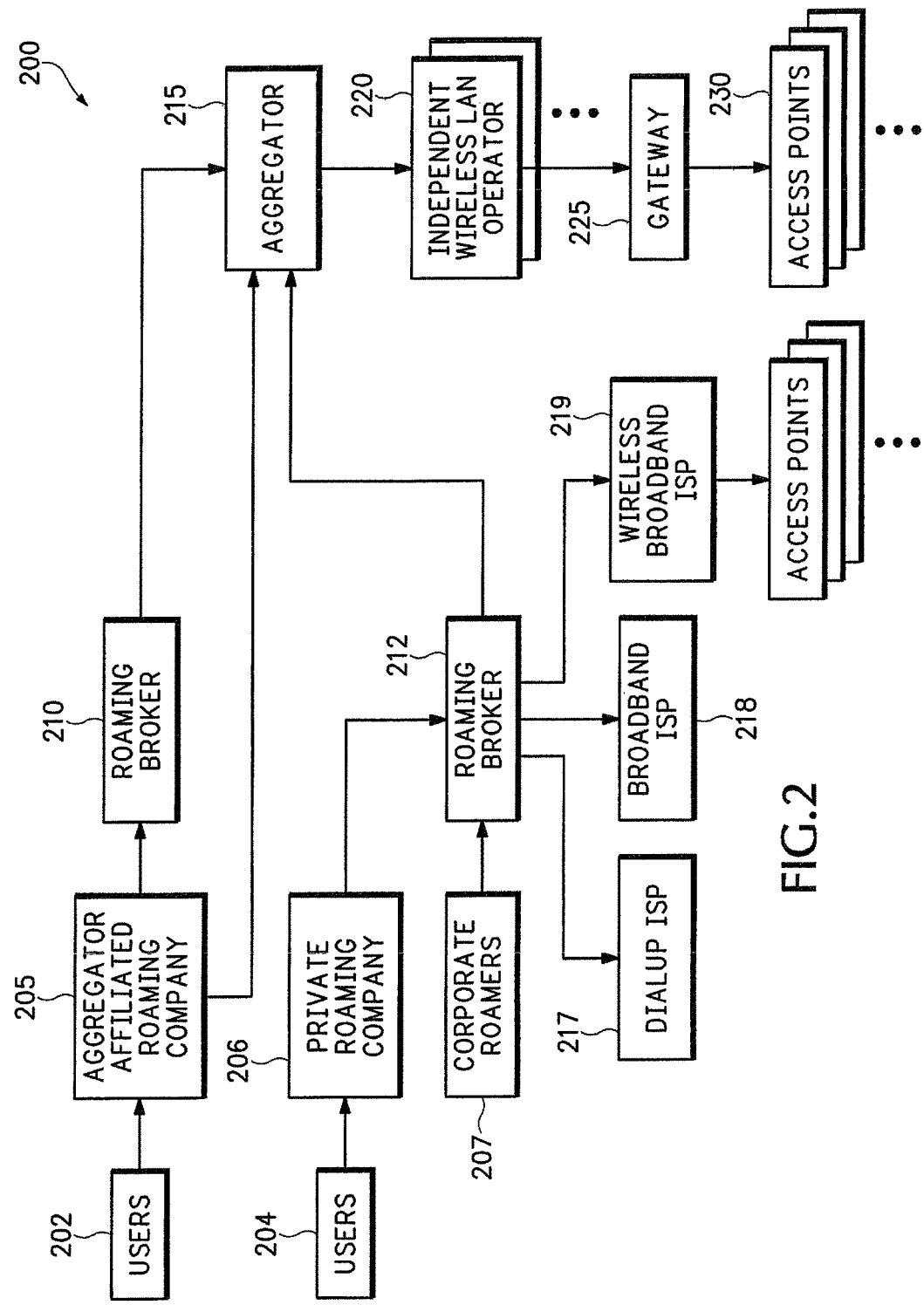
FIG. 2 illustrates another embodiment of the invention.

One embodiment of the invention contemplates aggregating independent wireless local area network operators under the management of a single entity, referred to herein as a wireless local area network (WLAN) aggregator, or simply, aggregator. The aggregator maintains a network server to support the service it provides the WLAN. The aggregator may also be responsible for presenting competitive Internet services to users, in particular, mobile wireless users, for selection of such services, and centralizing management of billing and receiving payment for such services. FIG. 2 illustrates network architecture 200, as well as the relationship between and business model encompassing the entities comprising the network architecture, envisioned in accordance with the embodiment of the invention.

Subscribers 202 and 204 access an internetwork such as the Internet utilizing mobile wireless user terminals (not shown). Many such subscribers need or desire access to the Internet when out of the office or traveling. When accessing the Internet from a location other than from their home location, the subscribers are said to be "roaming". Additionally, subscriber accounts and their user terminals can be initialized and configured so that regardless of where the subscriber attempts to access the Internet, they appear to be roaming.

The subscribers obtain wireless Internet service from anyone of multiple wireless local area network (WLAN) operators such as wireless LAN operator 220. Additionally, the subscriber may obtain Internet access via other services, such as a wireless broadband ISP, broadband ISP (e.g., Ethernet), or a dial-up modem based Internet service provider, depending on such factors as characteristics of service, access rates, geographic location, availability/coverage.

Roaming companies 205, 206, provide the subscribers access to the network. More particularly, roaming companies, among other things, establish and maintain a relationship with a subscriber, including maintaining the subscriber's account, billing the subscriber for services provided, and paying service providers or service provider brokers for services accessed by the subscriber.

The role played by a roaming company may vary. An aggregator affiliated roaming company 205 may establish an affiliation directly with a WLAN aggregation company 215 ("the aggregator"). The aggregator aggregates the Internet services provided by numbers of typically small, independent WLAN operators. (The aggregator, its functionality, and affiliation with the roaming company 205, are discussed more fully below). It is appreciated that the roaming company may also or alternatively work through a roaming broker company 210, or simply, broker, to provide wireless Internet access to its subscribers. Alternatively, a roaming company 205, 206 may only establish an affiliation with one or more brokers, such as one of brokers 210, 212, to provide access to it subscribers.

Either broker may offer Internet service access via any one of several Internet Service Providers (ISPs) 217, 218, 219 and 215. The ISPs, in turn, provide various types of connections to the Internet, including, as examples, dialup modem, xDSL, Ethernet, or wireless access. Finally, a corporation 207 may go through a broker 212 to obtain Internet access for its employees/agents. In the case of corporate subscribers, individual accounts typically are not independently billed—rather, usage is sponsored by a single corporate account with the broker.

A broker serves, as the name suggests, as an intermediary between roaming companies and several, typically large, ISPs. The broker aggregates local and/or regional ISPs into a single unified, globally accessible ISP. The broker presents to the roaming companies a unified service plan by negotiating with each of the ISPs as a representative of the many roaming companies.

Dialup Internet service providers (e.g., ISP 217) typically provide access to banks of dial-up modems in various geographic regions. These regions tend to be localized in countries or regions based on telephone access tariff and governmental structures. Broadband Internet service providers (e.g., ISP 218) provide access to wired broadband Internet access utilizing communication technologies such as DSL and Ethernet. These ISPs typically are associated with hotel chains, phone companies, and others with the wired infrastructure and access to usage locations.

Wireless Internet service providers (e.g., ISP 219) provide access to wireless, typically broadband, Internet connections. Some of these providers offer fixed wireless access while other providers offer portable, or mobile, access through WLAN and other technologies. Still others provide high-speed mobile connections using technologies such as GPRS. These service providers typically have substantial investments in licensed frequency spectrum or exclusive rights to Internet "hot spots", that is, geographic locations where Internet usage is relatively high, such as airports and convention centers.

Smaller wireless Internet service providers, referred to herein as independent WLAN operators, provide Internet connectivity. However, given the size of these operators, it is difficult to match up subscribers with the operators, especially when the subscriber is roaming and has no knowledge of the operator in or near the location where the subscriber is roaming. Aggregators such as aggregator 215 play an important role in such instances by providing a mechanism for potentially thousands of independent WLAN operators (e.g., operator 220) to present a unified service broadly accessible to roaming subscribers. The WLAN aggregator typically maintains a network server that provides location information helpful for finding WLAN access points 230, access service advertisements, characteristics of service testimonials, marketing, and other services to WLAN access point operators and end users. Importantly, the WLAN aggregator provides a secure, fraud-proof accounting mechanism that is used to transfer money from roaming companies which bill subscribers to the independent WLAN operators that provide packet data carriage service.

Independent WLAN operators (e.g., 220) provide a broadband wireless Internet connection for a local area. These operators are characterized by extremely low investment in equipment, use of unlicensed spectrum and equipment, and often by operating their WLAN service provider business as an adjunct to their core business. Typical examples are a library, coffee shop, household, dormitory, small hotel, gas station, etc.

The network components that make the aggregation of independent WLAN operators possible are the one or more roaming companies 210, 212, the aggregator 215 of independent WLAN operators 220, and the gateway 225. The roaming companies maintain subscriber accounts and collect money from the subscribers for WLAN access services rendered. These subscriber-generated funds are the ultimate source of all funds used to operate the network 200. These funds are also the source, at least in part, of the funds needed to encourage the building and expansion of the network.

In maintaining subscriber accounts, a roaming company operates a subscriber accounting service/server that authenticates a subscriber, verifying the subscriber's identity. The service further authorizes a billing charge against the subscriber's account, keeps track of the subscriber's account balance and ultimately pays the appropriate broker, ISP, or WLAN aggregator for cumulative usage.

In addition, the roaming company provides detailed usage information to the subscriber, reconciles usage records with the subscriber's notion of their usage, and collects payments from subscribers. The accounting server is a network component that can be accessed by the aggregator, or possibly directly by the operator's gateways, to provide the above mentioned user authentication and authorization services to the aggregator 215.

The aggregator performs many functions, including maintaining independent WLAN operator accounts, authenticating gateways associated with an WLAN operator, maintaining maps of available independent WLAN services by geographic location, and providing service advertisements, including competitive service advertisement certificates (including Characteristics of Service (COS) testimonials (certified performance advertisements)). In one embodiment, the service advertisements are distributed among and delivered by at least one server associated with each independent WLAN operator. Alternatively, the service advertisements are distributed among and delivered by at least one server associated with each Internet Service Provider that serves independent WLAN operators.

In order for the aggregator to provide competitive service advertisement certificates, including COS indications for a particular WLAN operator, the aggregator further monitors each WLAN operator for information. The aggregator may monitor, for each of WLAN operators, at least one of the following: a fee for the network access provided by the WLAN operator, for example, the price per a unit of service, however such service is calculated; a measure of a rate of data transferred by the WLAN operator, such as medium term maximum average data rate; a measure of latency in transmitting and receiving, data via the WLAN operator, for example, the typical round trip time; a measure of an availability of the network via the WLAN operator, which may be calculated a number of ways, including uptime/(uptime+downtime).

The aggregator may also monitor such WLAN operator characteristics as: an indication of a level of user satisfaction with the WLAN operator, including providing access to customer testimonials/reviews regarding the service; an indication of when the network was last accessed by a user via the WLAN operator, a measure of the number of users presently access the network via the WLAN operator (e.g., number of users "logged in"); an average data transmission rate for data transferred over the network via the WLAN operator, and an indication of available data transmission capacity of the WLAN operator.

It is appreciated that subscribers may be used in collecting characteristics of service metrics. For example, a subscriber's user terminal software may be asked to respond to a "ping" or other such echoing protocol, for example, with a sequence of small and/or large data packets to measure network characteristics such as latency and throughput. Data throughput may also be detected, for example, by flooding pings to a user that accesses the network via the WLAN operator to estimate a data rate, such throughput indicating, for example, an average of a number of floodings of pings done at random over a period of time The aggregator may provide a digitally certified (e.g., using a signed hash) service summary record that lists the above characteristics and geographic location information for a particular WLAN access point and those nearby the roaming subscriber. In one embodiment, the service offered is inseparable from the information provided in the summary record. The information provided may furthermore comprise a map of nearby WLAN access point locations, as well as a textual description of such locations. The map may include symbols or icons representing the locations of the WLAN access points. Moreover, the map may include directions from one WLAN access point to another—this would be useful, for example, in the event of multiple access points at the same longitude and latitude, but separated vertically, as in access points on different floors of an office building.

The WLAN access points advertised may include access points outside a range of access points immediately accessible to a subscriber, at least not without moving closer to the access points. Indeed, based on the characteristics of the access point, for example, the costs associated with accessing the network via the point, a subscriber may be willing to move to a new location within a range of which the access point is reachable to provide communication with the network.

In one embodiment of the invention, Internet service advertisements are presented by an independent WLAN operator, or gateway acting as an agent for the operator, but supplied to a subscriber by the aggregator in order that honest presentation of competing options are presented, that is, the aggregator digitally signs the advertisements, thereby creating a secure advertisement so that a particular WLAN operator is unable to tamper with the advertising information regarding competing WLAN operators.

The digitally certified summary may include a time window or a timestamp that prevents or prohibits continued use of old, outdated or otherwise obsolete advertisements and automatically invalidate forgeries of, or hacking into, advertisements. The time window specifies a period of time therein during which the advertising information is considered valid. The timestamp specifies a date after which, or a date from which is calculated a date after which, the advertising information is considered invalid.

Additionally, the aggregator measures WLAN performance on a per operator or per access point basis, including maintaining statistical information such as uptime, round-trip-time, throughput, etc., for the operator.

The aggregator also bills and collects funds from roaming companies for services rendered to their subscribers, holds payment promises in escrow until service has been confirmed, and ultimately makes payments to WLAN operators for the services rendered.

In this manner, the aggregator combines a number of independent WLAN operators, the number of which are otherwise too large, diverse, and uncooperative/competitive to be controlled by conventional business practices and, using secure digital encryption technologies, constrains them into providing a secure and reliable wireless data service to subscribers. To that end, the aggregator operates a server that is an intermediary between the WLAN operator gateways and the subscriber accounting servers operated by the roaming companies.

The third network component earlier mentioned as making aggregation of independent WLAN operators possible is the WLAN gateway 225, a network component that constrains the manner in which un-registered subscribers may access the Internet via one or more WLAN access points. The gateway separates a group of WLAN access points from the operator's WLAN. An agent resident in the gateway filters WLAN packets, allowing only properly registered subscribers to access the Internet. If a subscriber does not have a valid account on a roaming company server, then Internet access may be limited to a specialized subset of the Internet (e.g., new subscriber signup pages or location-based advertisements).

Additionally, the gateway acts as an intermediary between the subscriber's Internet service selection (or "dialer") software and the aggregator's server. (A discussion of the Internet service selection software is provided below). The gateway communicates with the authentication/authorization service on the roaming company server to account for all subscriber traffic passing through a particular access point. By soliciting payment promises from a subscriber and confirmations from an independent WLAN operator, the gateway conveys a subscriber's commitment to pay for Internet service back to the account managers at both the roaming company's server and the aggregator's server for the subscriber and operator respectively. Finally, the gateway presents service advertisement information to the subscriber's user terminal, listing services available, cost, performance, and nearby competing service offerings.

In one embodiment, the gateway is implemented on the WLAN operator's platform, rather than a separate platform coupled between the access points and the operator's platform. To do so, software that implements the gateway functionality would be installed and executed on the operator's platform in such a manner as to cooperate with the ISP routing infrastructure.

Following is an outline of the functions performed by each of the network components:

1) Subscriber's Agent ("dialer") Functions:
find available connections;
solicit service offerings (price and quality (signal strength, speed, latency, complaint count));
display location based map of access points based on latest information from a central registration database of independent WLAN operators maintained by the aggregator;
allow the user to select from the displayed service offerings or auto-select on behalf of the subscriber;
initiate service request after selecting;
prove identity of subscriber;
authorize payment by subscriber;
firewall filter incoming (and, in one embodiment, outgoing) traffic;
set-up/re-establish a virtual private network (VPN) to a home base or local VPN service;
authorize additional payments as credit is consumed by a subscriber;
reconcile log against monthly bill and alert aggregator when inconsistencies occur;
participate in WLAN access point performance evaluations for producing quality metrics;

2) Operator's Agent (Gateway) Functions:
DHCP server or proxy/gateway to provide IP address;
transmit Internet service advertisements;
redirect new subscriber to a signup page operated by the aggregator;
challenge subscriber's identity;
solicit payment authorization certificates from subscribers;
avoid giving free service to unregistered or other users;
terminate local VPN for over-the-air security;
send session bills to database maintained at aggregator's server;
periodically send "I am alive" to aggregator so that the access point locations database can be kept up to date;

3) Roaming Company Accounting Server Functions:
maintain credit card account for each subscriber;
maintain micro-transaction account for each subscriber;
maintain additional personal billing information for each subscriber;
communicate with subscribers via email;
maintain a subscriber's secret key;
accept usage records from aggregators;
maintain online account status for subscribers;
pay monthly settlements to roaming brokers and aggregators;

4) Aggregator Accounting Server Functions:
maintain WLAN operator's credit card account;
maintain WLAN operator's micro-transaction account;
maintain operator's email address;
maintain database of access points locations, status, performance;
keep complaint logs for operators;
keep operator's secret key;
keep list of recent checks cashed to avoid replay attacks in spite of clock offsets;
secure clock setting service for subscribers and operators;
maintain a list of free-trial subscribers keyed by credit card numbers, with a limit of some number of days of free trial per credit card number;
measure access point performance by pinging subscribers for round-trip-time, back-haul data rate, dropped packet rate, etc. This information is provided in encrypted (non-modifiable) form to the gateway for service advertisement;
maintain new operator signup web pages;
maintain online account status for operators;
generate and provide maps of access point locations to help subscribers find nearby Internet services.

On a user terminal, Internet selection software, or "dialer" software, is executed in accordance with an embodiment of the invention to perform a number of functions, including finding available Internet connections, soliciting information about Internet service offerings, receiving Internet access service advertisements, and displaying and/or automatically selecting one of the service offerings. The service offering descriptions may include offerings not directly visible to the subscriber, but obtained indirectly via a wireless access point that is visible. The dialer software may present a menu of service alternatives, highlighting available and/or potentially available service offerings.

Additionally, the dialer software provides for information evidencing the identity of the subscriber at the user terminal, authorizing payment for services, including authorizing additional payments as credit is consumed. The software furthermore may provide for display of a location based map of wireless access points based on information obtained from a database of independent WLAN operators maintained, for example, on the aggregator's server.

In particular, solicitation of service offerings contemplates the user terminal querying a wireless access point, or a database of information about wireless access points, for information relating to the service offerings for the access point. Information relating to service offerings includes such things as backhaul speed, latency, price per byte, price per service period, etc. A typical example may include the information in the form of: "1.5 Mbps, 20 msec, $0.10/MB, $0.50/day (for a particular business franchise), Grade 1", or "40 kbps, 90 msec, $0.25/MB, $0.00/day, Grade 4".

Furthermore, the provider of the information, whether a gateway or an aggregator maintained database, may provide information about some number of geographically closest alternative wireless access points, so that a subscriber may choose which service best fits their needs, budget, etc. Based on subscriber-configurable selection rules, the subscriber can have their dialer software automatically select ("autoselect") or at least automatically highlight the "best" service, whether best means lowest cost, fastest, or otherwise most desirable service.

The auto select feature operates, for example, based on user preferences, such as, but not limited to, minimum data transmission speed, maximum service fees, minimum characteristics of service parameters, some combination thereof, or a tradeoff between preferences (e.g., minimum data transmission speed versus service fees).

The user or auto selector chooses and requests the service desired. This request may be in the form of a purchase order for a unit of service. For example, the subscriber may request purchase of a day of service, and request minting of a session identifier to be associated with the purchase of such service. The gateway, for example, provides the session identifier, S. The dialer software then continues with authorizing payment of the appropriate amount for the day's service, for the session identified by session key S. The payment, whether by check or certificate, may be signed by the subscriber's private security key and sent by the gateway to the aggregator for verification.

In one embodiment, on fee-per-packet, fee-per-byte, or fee-per-minute services, money or payment may be metered out to the gateway as the subscriber consumes the service. For example, the dialer software can deposit certificates with the gateway as service is consumed, thus limiting the ability of a gateway to disappear or otherwise become unavailable before the subscriber's credit is all used. The process of minting additional certificates and keeping the service in place should be autonomous from the perspective of the subscriber, handled by the dialer software.

A typical scenario of operation of the above-described embodiment is as follows. An individual, not yet a subscriber, installs a WLAN network interface card (NIC) in a user terminal, e.g., a laptop computer, and moves within range of a wireless access point coupled to an independent WLAN associated with an aggregator. The WLAN software (protocol stack) in the individual's laptop obtains an IP address, e.g., using the well known Dynamic Host Configuration Protocol (see Internet Engineering Task Force (IETF) Request for Comments (RFC) 2131. In this instance, DHCP, mediated by the gateway, e.g., gateway 225, provides a Internet Protocol (IP) address to the individual's laptop that routes or redirects packets from the individual's laptop to the gateway, and in particular, to a web page via which the individual is asked to provide as input information needed to sign up for the WLAN service provided via the aggregator. In one embodiment, the service may initially be offered on a free trial basis. Such free service could be keyed by credit card, so that if the user, after free service expired a selected number of days, tried to again sign up for free service using the same credit card, the free service would be denied. In another embodiment, all HTTP (web browsing traffic) for an unregistered user is redirected to a subscription sign up web page.

The sign up web page may provide, for example, the ability to download free-trial software. After installing the software, the subscriber enjoys authorized access to the network for a limited period of time without a fee—in such case, the aggregator or a WLAN access point operator may subsidize the service for the limited period of time. Abuse of the free-trial service can be controlled by requiring submission of valid credit card information and utilizing a database of past free trials to allow only a limited number of free trials per a given time period and credit card.

The user enters credit card and personal information including email address, and in response, the individual is allowed to download the Internet service selection ("dialer") software and install the same on the laptop, and generally complete the registration process.

As a registered subscriber, the individual, still within range of a participating WLAN, invokes execution of the dialer software and queries for wireless access points. After finding a number of access points, and querying for rate information, the associated gateway(s) provide information regarding rate structures for services, as well as information regarding service grades as measured by the aggregator and maintained in a server associated therewith. Additionally, a list of geographically nearby access point locations is provided, such list provided and certified by the aggregator so that an independent WLAN operator cannot provide inaccurate or false information.

The subscriber selects the service desired, e.g., the service that best matches the subscriber's needs. Alternatively, the dialer software automatically selects the service, for example, based on subscriber selectable (input) criteria. The dialer requests the corresponding gateway for a session, in part, by providing a certificate that is good for at least a limited amount of service. The gateway verifies the certificate with the aggregator and then establishes a session.

At the close of the session, the gateway sends a session summary to the aggregator server, wherein the server creates a micro-transaction to transfer the specified value from the subscriber's account to the WLAN operator's account. The dialer software creates an entry in a local log file on the user terminal of the transfer. The log file maintains, among other things, a history of activity for the subscriber account associated with the user terminal, for later comparison against an invoice for services provided.

Local log files collect at the user terminal and are later automatically reconciled against a billing statement, wherein discrepancies may be flagged and information of such relayed to the aggregator. The frequency, degree, and direction of the discrepancies may be used as a basis, at least in part, for determining the reputation of a WLAN operator.

At the end of a billing period, for example, at the end of a month, the aggregator sends an email-based statement to subscriber accounts and WLAN operator accounts, charges (debits) the subscribers' accounts, and credits the operators' accounts accordingly. The aggregator withholds a portion of the subscriber's charge when crediting an operator's account. In one embodiment, the amount withheld could be nonlinear, for example, withholding a larger portion or fraction from more expensive operators to encourage operators to drive down usage rates, or any other such scheme to influence subscriber fees.

CONCLUSION

Although the invention has been described in the detailed description as well as in the Abstract in language specific to structural features and/or methodological steps, it is to be understood that the invention defined in the appended claims is not necessarily limited to the specific features or steps described. Rather, the specific features and steps are merely disclosed as exemplary forms of implementing the claimed invention. It will, however, be evident that various modifications and changes may be made thereto without departing from the broader spirit and scope of the present invention. The specification and figures are accordingly to be regarded as illustrative rather than restrictive. The description and abstract are not intended to be exhaustive or to limit the present invention to the precise forms disclosed.

The terms used in the following claims should not be construed to limit the invention to the specific embodiments disclosed in the specification. Rather, the scope of the invention is to be determined entirely by the following claims, which are to be construed in accordance with the established doctrines of claim interpretation.

I claim:

1. A method, comprising:
    monitoring, by a processing device operatively coupled to a plurality of Wireless Local Area Network (WLAN) operators through a corresponding Internet Service Provider (ISP) backhaul line, service metrics associated with network services provided by each of the plurality of WLAN operators coupled with at least one access point that is available to provide a user terminal with access to a network;
    transmitting, by the processing device, the service metrics to the user terminal;
    receiving, by the processing device, a selection of a WLAN operator responsive to transmitting the service metrics; and
    authorizing, by the processing device, the user terminal to access the network via an access point associated with the selected WLAN operator.

2. The method of claim 1, further comprising receiving, by the processing device, a service request from the user terminal to access a service from the selected WLAN operator, wherein the service request comprises subscriber data associated with a roaming service.

3. The method of claim 1, wherein the service metrics are associated with one or more access points that are currently out-of-range of the user terminal.

4. The method of claim 1, wherein the service metrics comprise a data transfer rate provided to the selected WLAN operator by one or more ISPs operatively coupled to the ISP backhaul line.

5. The method of claim 1, wherein the service metrics comprise at least one of: WLAN access point location information, WLAN quality of service statistics, WLAN characteristics of service testimonials, or marketing information.

6. The method of claim 1, wherein the access point accessed by the user terminal is selected from a plurality of access points that are controlled by different WLAN operators, wherein the service metrics are associated with the plurality of access points, and wherein the access point is selected based, at least in part, on receiving the selection of the WLAN operator.

7. An apparatus, comprising:
    means for monitoring service metrics associated with network services provided by each of a plurality of WLAN operators coupled with at least one access point that is available to provide a user terminal with access to a network;
    means for transmitting the service metrics to the user terminal; and
    means for receiving a selection of a WLAN operator responsive to transmitting the service metrics, wherein the user terminal is authorized to access the network via an access point associated with the selected WLAN operator.

8. The apparatus of claim 7, wherein the means for receiving comprises means for receiving a service request from the user terminal to access a service from the selected WLAN operator.

9. The apparatus of claim 8, further comprising means for authorizing payment associated with the service request, wherein the payment authorization is conveyed to a roaming services provider.

10. The apparatus of claim 9, wherein the roaming services provider operates as a broker for providing the user terminal with network access through a plurality of different Internet Service Providers, and wherein at least a portion of the payment is provided to one or more of the different Internet Service Providers based, at least in part, on an identity of the selected WLAN operator.

11. The apparatus of claim 7, wherein the service metrics comprise a data transfer rate provided to the selected WLAN operator by one or more Internet Service Providers operatively coupled to an Internet Service Provider backhaul line.

12. The apparatus of claim 11, wherein the apparatus is operatively coupled to the Internet Service Provider backhaul line.

13. The apparatus of claim 7, wherein the service metrics comprise at least one of: WLAN access point location information, WLAN quality of service statistics, WLAN characteristics of service testimonials, or marketing information.

14. A memory device having instructions stored thereon that, in response to execution by a computing device, cause the computing device to perform operations comprising:
    monitoring service metrics associated with network services provided by each of a plurality of WLAN operators coupled with at least one access point that is available to provide a user terminal with access to a network;
    transmitting the service metrics to the user terminal;
    receiving a selection of a WLAN operator responsive to transmitting the service metrics; and
    facilitating access by the user terminal to the network via an access point associated with the selected WLAN operator.

15. The memory device of claim 14, wherein the service metrics are transmitted to the user terminal as advertising information associated with the plurality of WLAN operators.

16. The memory device of claim 14, wherein the service metrics are provided for a plurality of access points, including a first access point that is in-range of the user terminal and a second access point that is out-of-range of the user terminal.

17. The memory device of claim 14, wherein the service metrics comprise at least one of: WLAN access point location information, WLAN quality of service statistics, WLAN characteristics of service testimonials, or marketing information.

18. The memory device of claim 14, wherein the memory device is associated with a service metrics aggregator operatively coupled to the one or more Internet Service Providers by one or more Internet Service Provider backhaul lines.

19. The memory device of claim 14, wherein the WLAN operator is selected from the plurality of WLAN operators, and wherein the service metrics associated with the plurality of WLAN operators are stored in a centralized database.

* * * * *